(12) United States Patent
Kim

(10) Patent No.: US 8,125,772 B2
(45) Date of Patent: Feb. 28, 2012

(54) ELECTRONIC APPARATUS HAVING A DISPLAY DEVICE

(75) Inventor: Young-Su Kim, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/987,392

(22) Filed: Nov. 29, 2007

(65) Prior Publication Data

US 2008/0309842 A1 Dec. 18, 2008

(30) Foreign Application Priority Data

Jun. 14, 2007 (KR) .................. 10-2007-0058476

(51) Int. Cl.
*G06F 1/16* (2006.01)
*G02F 1/1333* (2006.01)
*H01Q 1/24* (2006.01)
*H04M 1/00* (2006.01)

(52) U.S. Cl. ............... 361/679.24; 361/679.21; 349/58; 343/702; 455/575.7

(58) Field of Classification Search .............. 361/681, 361/683, 679.24, 679.21–679.3, 679.01–679.45, 361/679.55–679.59; 349/58; 248/917, 919, 248/291.1; 455/575.7; 343/702; 312/223.1, 312/223.2
See application file for complete search history.

(56) References Cited

U.S. PATENT DOCUMENTS

| | | | | |
|---|---|---|---|---|
| 5,268,816 A | * | 12/1993 | Abell et al. .................. | 361/681 |
| 6,636,282 B2 | * | 10/2003 | Ogawa et al. .................. | 349/58 |
| 7,242,353 B2 | * | 7/2007 | Hung et al. .................. | 343/702 |
| 7,679,893 B2 | * | 3/2010 | Lam et al. ................ | 361/679.26 |
| 2002/0021250 A1 | * | 2/2002 | Asano et al. .................. | 343/702 |
| 2003/0124985 A1 | * | 7/2003 | Shin et al. ........................ | 455/82 |
| 2003/0222823 A1 | * | 12/2003 | Flint et al. .................... | 343/702 |
| 2004/0145311 A1 | * | 7/2004 | Su et al. ........................ | 313/512 |
| 2004/0209646 A1 | * | 10/2004 | Murayama et al. ........ | 455/556.1 |
| 2004/0239569 A1 | * | 12/2004 | Park .............................. | 343/702 |
| 2005/0104788 A1 | * | 5/2005 | Hung et al. ................... | 343/702 |

* cited by examiner

*Primary Examiner* — Jayprakash N Gandhi
*Assistant Examiner* — Nidhi Desai
(74) *Attorney, Agent, or Firm* — McKenna Long & Aldridge LLP

(57) ABSTRACT

An electronic apparatus having a display device and method of manufacturing are disclosed, and particularly, an electronic apparatus of reduced size by having a front cover having a first cut-out portion; a rear cover having a second cut-out portion, wherein the front cover and the rear cover are joined together to house the flat display panel therebetween such that first and second cut-out portions are aligned to form a groove; and at least one antenna in the groove.

11 Claims, 3 Drawing Sheets

ELECTRONIC APPARATUS HAVING A DISPLAY DEVICE

This application claims the benefit of Korean Patent Application No. 2007-0058476, filed on Jun. 14, 2007, which is hereby incorporated by reference for all purposes as if fully set forth herein.

BACKGROUND OF THE INVENTION

1. Field of the Invention

The present invention relates to an electronic apparatus having a display device and method of manufacturing, and more particularly, to an electronic apparatus of reduced size by configuring a groove, into which an antenna is disposed, at a side portion of a liquid crystal display module of a display device.

2. Discussion of the Related Art

In general, electronic apparatuses such as portable computers, cellular phones, and PDAs, for example, may be provided with a main body and a display device for displaying images thereon. Among these display devices, liquid crystal display modules which are small, light weight, and have low power consumption are increasingly favored.

A desired image can be displayed on a screen of the liquid crystal display module by adjusting light transmittance according to an image signal applied to a plurality of controlling switching devices aligned in a matrix.

Electronic apparatuses such as portable computers, cellular phones and PDAs, for example, have superior mobility thus enabling wireless communication to be performed anywhere.

In order for those electronic apparatuses to have a wireless communication function, they should include a wireless communication enabled wireless LAN (Local Area Network) module or a Bluetooth module as a wireless local area communication technology. An antenna is required for the wireless LAN module or the Bluetooth module. At least one antenna may be provided.

One electronic apparatus having a display device according to the related art will be described with reference to the accompanying drawing.

As an example, FIG. 1 shows a related art portable computer as one of various types of electronic apparatuses each having a display device.

As shown in FIG. 1, an electronic apparatus 1 includes a main body 1b, and a display device 1a for displaying information from the main body 1b.

The display device 1a may include an antenna 2 through which waves are transmitted and received, a rear case 3 having the antenna 2 therein, and a liquid crystal display module 10 disposed in the rear case 3 to display images. The main body 1b may include a communication controller (not shown) to perform wireless communications using waves transmitted and received through the antenna 2. The display device 1a may further include a front case 4 coupled to the rear case 3 to cover the liquid crystal display module 10 and the antenna 2.

The antenna 2, disposed in the electronic apparatus having such configuration, is located at a left hand/right hand side, or upper side of the display device 1a for the facilitation of wireless communication. Thus, because the antenna 2 may be located at the left hand/right hand side or upper side of the display device 1a, as shown in FIG. 1, when the display device 1a is opened up upon use of the electronic apparatus 1, the antenna 2 can be located at a relatively high position, thereby facilitating wireless communication.

However, because the antenna 2 is located at the side surface of the liquid crystal display module 10, the rear case 3 and the front case 4 having the liquid crystal display module 10 therebetween becomes larger in size, which results in an overall increase in the entire size of the electronic apparatus 1.

SUMMARY OF THE INVENTION

Accordingly, the present invention is directed to an electronic apparatus and method of manufacturing having a display device that substantially obviates one or more of the problems due to limitations and disadvantages of the related art.

An advantage of the present invention is to provide an electronic apparatus of reduced size by employing a groove corresponding to an antenna for wireless communication at a side portion of a liquid crystal display module such that the antenna may be disposed in the groove.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

These and other advantages and in accordance with the purpose of the present invention, as embodied and broadly described, there is provided a flat display panel comprising: a front cover having a first cut-out portion; a rear cover having a second cut-out portion, wherein the front cover and the rear cover are joined together to house the flat display panel therebetween such that first and second cut-out portions are aligned to form a groove; and at least one antenna in the groove.

Another advantage is to provide a method of manufacturing a flat panel display device comprising: forming a front cover having a first cut-out portion; forming a rear cover having a second cut-out portion; joining front and rear covers to form a flat display panel therebetween; aligning first and second cut-out portions to form a groove; and forming at least one antenna in the groove.

Still another advantage is to provide a method of manufacturing a notebook computer comprising: forming a main body; connecting a display device to the main body; forming a front cover having a first cut-out portion; and forming a rear cover having a second cut-out portion; joining front and rear covers to house a flat display panel therebetween; aligning first and second cut-out portions to form a groove; and forming at least one antenna in the groove.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
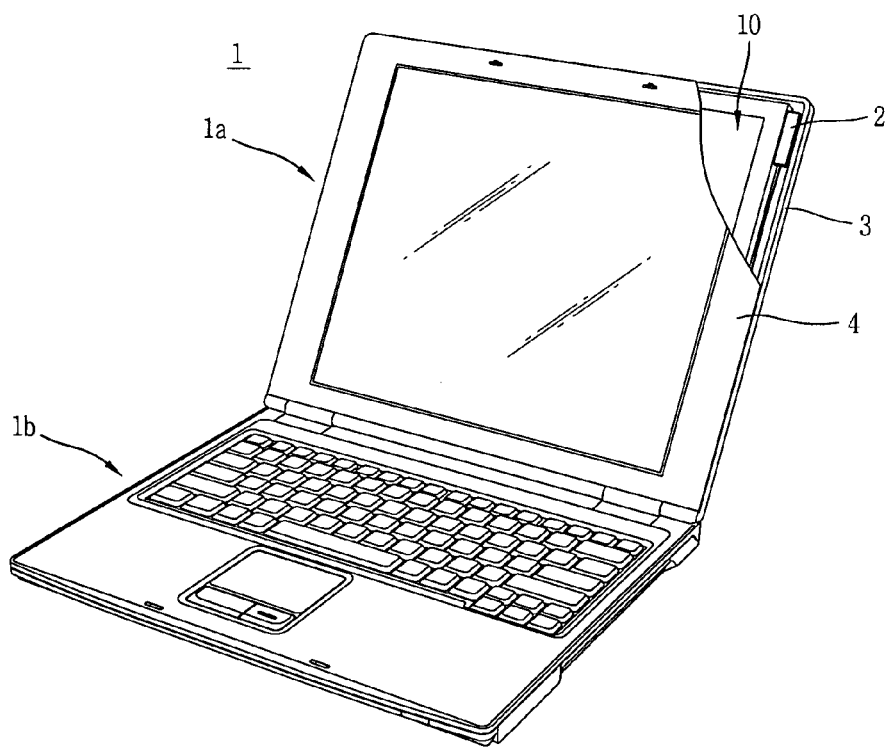
FIG. 1 is an assembled perspective view showing a related art electronic apparatus.
Figure 2:
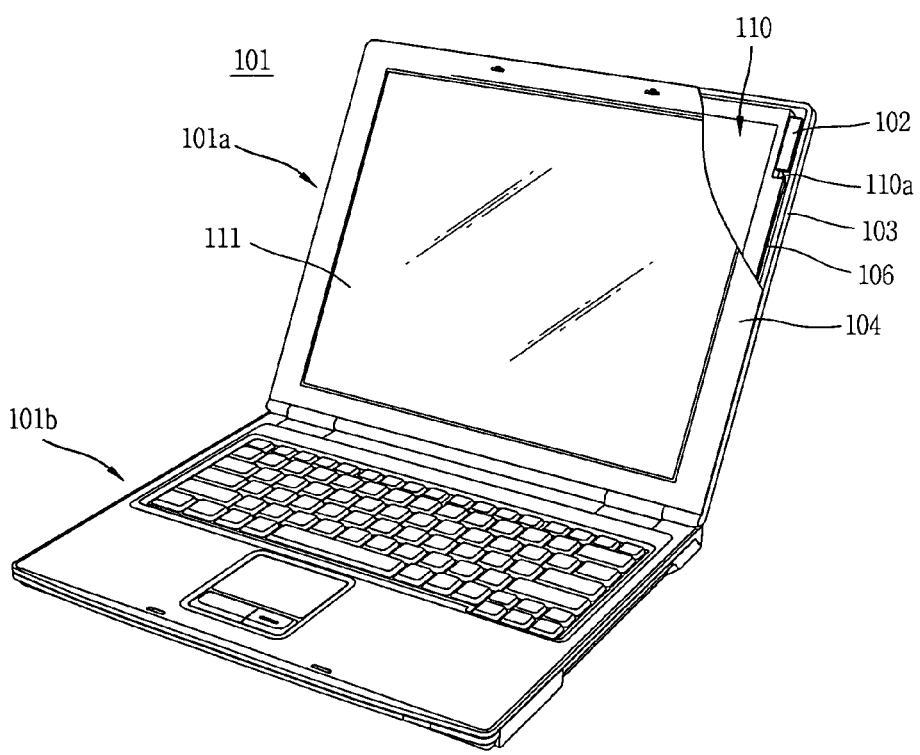
FIG. 2 is an assembled perspective view showing an electronic apparatus in accordance with an embodiment of the present invention.
Figure 3:
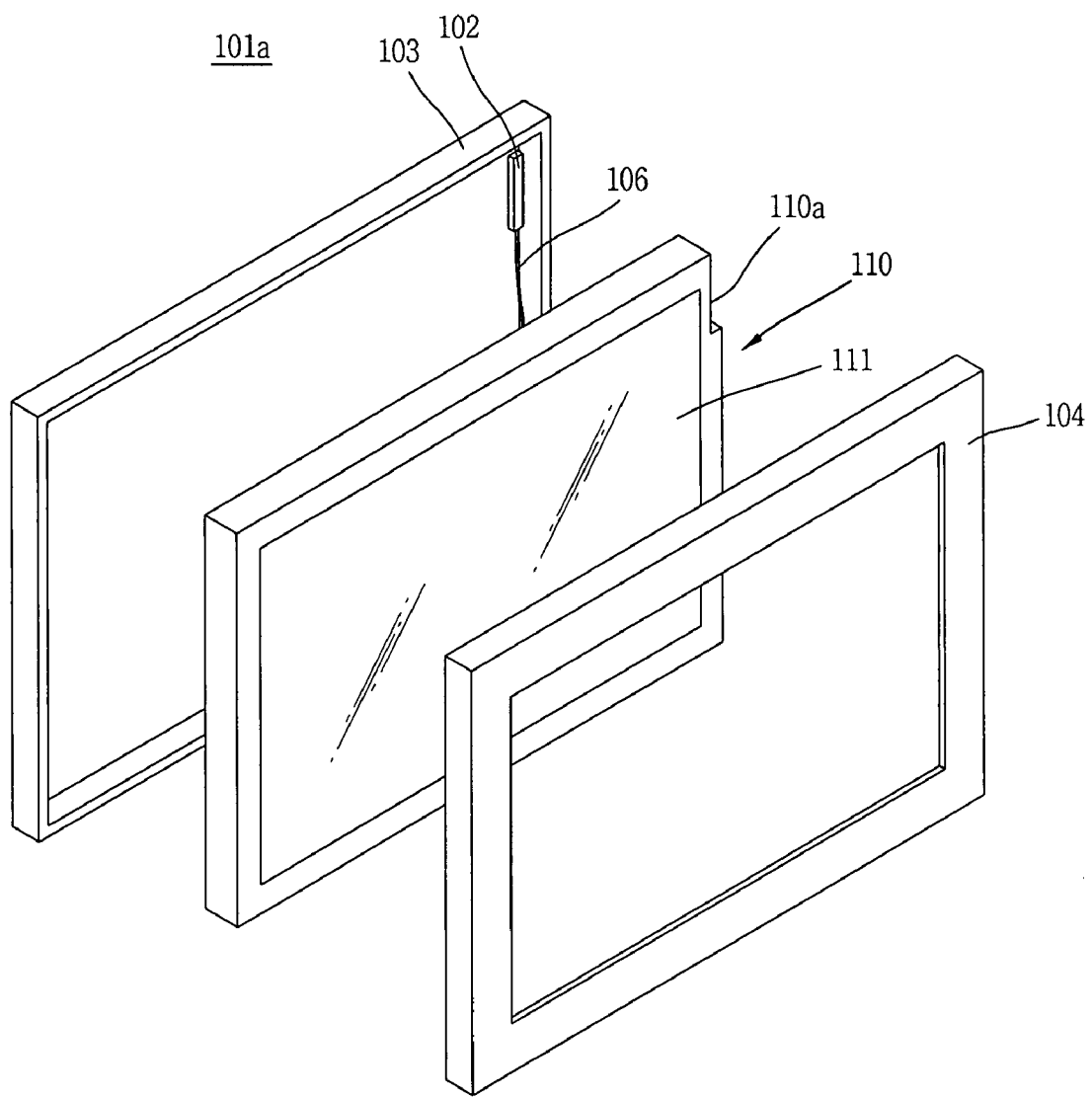
FIG. 3 is an exploded perspective view showing a display device of FIG. 2.
Figure 4:
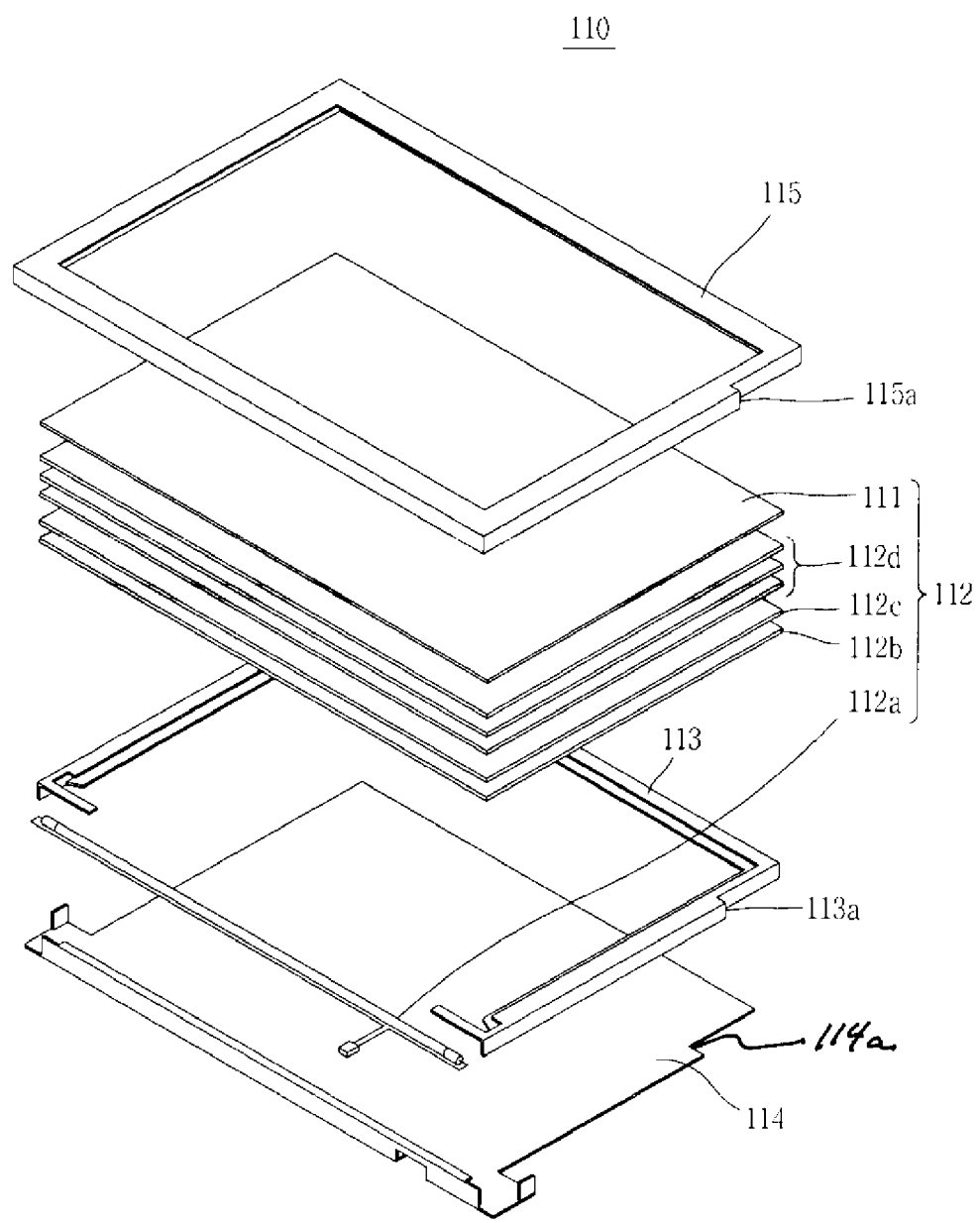
FIG. 4 is an exploded perspective view showing a liquid crystal display module of FIG. 3.

As shown in FIGS. 2 to 4, an electronic apparatus 101 in accordance with an embodiment of the present invention may include at least one antenna 102 to transmit and receive waves, a rear case 103 having the antenna 102 therein, a liquid crystal display module 110 mounted in the rear case 103 and having a cut-out portion 110a to which the antenna 102 is coupled, and a main body 101b having a communication controller which performs wireless communications using waves transmitted and received through the antenna 102. Furthermore, a groove may result from the alignment of first and second cut-out portions which will be described in detail later on in the specification.

Here, the liquid crystal display module 110 may include a liquid crystal panel 111, a backlight 112 to supply light to the liquid crystal panel 111, and covers 113, 114 and 115 to cover both the liquid crystal panel 111 and the backlight 112 by receiving them therein. Here, the cut-out portion 110a may be disposed at a side portion of the liquid crystal display module 110, namely, at a side portion of the covers 113, 114 and 115.

The electronic apparatus 101 may further include a front case 104 coupled to the rear case 103 to partially cover the liquid crystal display module 110 therein.

The electronic apparatus 101 according to the present invention having such configuration will now be described in detail.

The electronic apparatus 101 may roughly be divided into the main body 101b and a display device 101a.

FIG. 2 shows the entire electronic apparatus 101, while FIG. 3 shows the partial exploded view of the display device 101a for the electronic apparatus 101.

The outside of the main body 101b may be formed by coupling an upper case and a lower case to each other. A keyboard, having a plurality of keys arranged thereon, for allowing a user to input information, is provided on the upper case. A CPU (Central Processing Unit, not shown) and a communication controller for wireless communications, i.e., a LAN (Local Area Network card) (not shown) may be disposed in a space between the upper and lower cases.

The outside of the display device 101a is formed by coupling the rear case 103 and the front case 104 to each other. The antenna 102 and the liquid crystal display module 110 are disposed in a space between the rear case 103 and the front case 104. Particularly, an open portion through which an area for displaying images on the liquid crystal panel 111 is exposed to the outside is provided on the front case 104.

As shown in FIG. 2, the main body 101b and the display device 101a are connected to each other by a hinge mechanism. The hinge mechanism may include a rotation unit to rotate the display device 101a to be opened or closed such that the liquid crystal panel 111 can either be seen or cannot be seen by the user. The hinge mechanism is one way of connecting the main body and display device but other suitable connecting mechanisms may be employed.

The antenna 102 transmits and receives wireless signals, and is connected to the communication controller (i.e., the LAN card) via a connection wire 106.

To simplify explanation of the embodiments of the present invention, all of the antenna 102, the connection wire 106, and the communication controller are referred to as a wireless LAN module.

FIG. 2 shows the display device 101a of the electronic apparatus 101 from which the front case 104 is partially removed. As shown in the drawing, the antenna 102 coupled to the cut-out portion 110a of the liquid crystal display module 110 may be disposed at an inner space between the front case 104 and the rear case 103. That is, the antenna 102 is mounted at the inside of the rear case 103 and coupled to the cut-out portion 110a of the liquid crystal display module 110, as will be explained later.

With reference to the accompanying drawings, the present invention illustrates that the electronic apparatus 101 has one antenna 102, but the present invention is not intended to be limited to such a structure. A plurality of antennas may be provided in order to improve the reception efficiency of wireless signals.

In addition, with reference to the drawings, the electronic apparatus 101 may be implemented with only the antenna 102 as one of the components of the wireless LAN module, but the present invention is not intended to be thus limited. Various types of antennas may further be included, such as an antenna as a component of a Bluetooth module for wireless local area communications.

Further, in the accompanying drawings, it is illustrated that the antenna 102 is disposed at an upper right hand portion in the rear case 103, but the present invention is not intended to be thus limited. The antenna 102 may be disposed at various other locations. That is, the portion where the antenna 102 is disposed in the electronic apparatus 101 may have design variance depending on the model or type of the electronic apparatus 101 in order to obtain a high reception efficiency of wireless signals.

Although not shown in the drawings, the communication controller may be disposed inside the main body 101b of the electronic apparatus 101 to process wireless signals transmitted and received through the antenna 102. That is, the communication controller may be disposed at the inner space between the upper case and the lower case of the main body 101b coupled to each other, and connected to the antenna 102 via the connection wire 106.

The connection wire 106 connecting the antenna 102 to the communication controller, as shown in FIGS. 2 and 3, may be aligned along a gap between an inner side surface of the rear case 103 and an outer side surface of the liquid crystal display module 110. The connection wire 106 may be coupled among plural protrusions, for example, (not shown) formed inside the rear case 103 to be fixed thereto.

To simplify explanation, FIG. 4 shows each component in an exploded view from the liquid crystal display module 110 of the display device 101a of the electronic apparatus 101 shown in FIGS. 2 and 3.

As shown in FIG. 4, the liquid crystal display module 110 may include a liquid crystal panel 111, a backlight 112 to supply light to the liquid crystal panel 111, and covers 113, 114 and 115 to receive therein the liquid crystal panel 111 and the backlight 112. The cut-out portion 110a coupled to the antenna 102 may be disposed at a side portion of the liquid crystal display module 110, namely, at a side portion of the covers 113, 114 and 115. Here, the cut-out portion 110a is configured by a first cut-out portion 113a and a second cut-out portion 115a, respectively, formed at the upper cover 115 and the main support cover 113, a detailed explanation of which will be made later.

The liquid crystal panel 111 may include further a first substrate (i.e., a color filter substrate) and a second substrate (i.e., a thin film transistor array substrate), and a liquid crystal layer being interposed between the first and second substrates.

The backlight 112 may include fluorescent lamps or light emitting diodes, as a light source 112a. The backlight 112 may further include, in addition to the light source 112a, a light guide plate 112c to guide light emitted from the light source 112a toward the liquid crystal panel 111, a reflection sheet 112b to reflect light leaked from a lower portion of the light guide plate 112c after being emitted from the light source 112c to the inside of the light guide plate 112c, and an optical sheet 112d to convert light emitted from the light guide plate 112c and then apply the converted light to the liquid crystal panel 111.

Also, a plurality of covers 113, 114 and 115 may be provided as units for receiving therein the backlight 112 and the liquid crystal panel 111 and maintaining the completed device. The covers 113, 114 and 115 may include a main support 113, a lower cover 114 and an upper cover 115.

Here, the main support cover 113 receives the backlight 112 and the liquid crystal panel 111 thereon to maintain the completed device. The lower cover 114 may be partially coupled to the main support cover 113 to cover the back light 112. The upper cover 115 covers edges of an upper surface of the liquid crystal panel 111 and side surfaces thereof to protect the liquid crystal panel 111.

The lower cover 114, however, according to the present invention is not limited to being partially coupled to the main support cover 113 and then covering the backlight 112, but may entirely cover the lower portion and the side portion of the main support cover 113 as well and within the scope of the present invention.

The liquid crystal display module 110 having such configuration may have the cut-out portion 110a to which the antenna 102 is coupled. As shown in FIG. 4, the cut-out portion 110a may be configured such that first cut-out portion 113a and second cut-out portion 115a are disposed in the main support cover 113 and the upper cover 115, respectively, to be aligned with each other by overlapping to form a groove. That is, the cut-out portion 110a may be formed such that an area corresponding to the first cut-out portion 113a on an outer surface of the main support 113 comes into contact with an area corresponding to the second cut-out portion 115a on an inner surface of the upper cover 115.

Here, the first cut-out portion 113a corresponds to the antenna 102 and forms a substantially rectangular parallelepiped shape capable of being overlapped by the second cut-out portion 115a to form a groove. The first cut-out portion 113a may be thinner than the side portion of the main support cover 113. That is, the first cut-out portion 113a may be substantially concave to have a particular depth or length from an outer side surface of the main support cover 113. The first cut-out portion 113a may be thus designed to prevent damage to the main support cover 113.

The second cut-out portion 115a corresponds to the antenna 102 and forms a substantially rectangular parallelepiped shape capable of overlapping with the first cut-out portion 113a. The second cut-out portion 115a is also implemented such that the side portion of the upper cover 115 may be partially recessed into the upper cover 115. That is, the second cut-out portion 115a from the outside of the upper cover 115, the side portion of the upper cover 115 may be partially recessed into the upper cover 115. On the other hand, the second cut-out portion 115a from the inside of the upper cover 115, the upper cover 115 may be partially protruded into the upper cover 115.

As such, the sizes of the first cut-out portion 113a and the second cut-out portion 115a may be the same as or smaller than that of the antenna 102. That is, the size of the groove formed by aligning the first cut-out portion 113a to the second cut-out portion 115a may be the same as or smaller than the size of the antenna 102.

The cut-out portion 110a in the electronic apparatus 101 according to an embodiment of the present invention is exemplarily implemented by contacting the first cut-out portion 113a of the main support cover 113 and the second cut-out portion 115a of the upper cover 115 to each other; however, the present invention is not thus limited. Alternatively, in case of covering all of the lower portion and the side portion of the main support cover 113 by the lower cover 115, a third cut-out portion 114a may be disposed in the lower cover 114 such that the third cut-out portion 114a can be coupled to the first cut-out portion 113a and the second cut-out portion 115a, thereby forming the cut-out portion 110a.

The accompanying drawings also illustrate one cut-out portion 110a and one first cut-out portion 113a and one second cut-out portion 115a forming the cut-out portion 110a. The present invention is not limited to those embodiments, but may also include the cut-out portion 110a and the first cut-out portion 113a and the second cut-out portion 115a forming the cut-out portion 110a in plurality according to the number of antennas 102 disposed in the electronic apparatus 101.

In addition, the description, with reference to the accompanying drawings, illustrates that the cut-out portion 110a and the first cut-out portion 113a and the second cut-out portion 115a forming the cut-out portion 110a exemplarily have the substantially rectangular parallelepiped shape, but the present invention is not thus limited. The cut-out portion 110a and the first cut-out portion 113a and the second cut-out portion 115a may have various shapes according to the shape of the antenna 102 disposed in the electronic apparatus 101.

In the accompanying drawings, the cut-out portion 110a and the first cut-out portion 113a and the second cut-out portion 115a are formed at the upper right hand portion of the liquid crystal display module 110, but the present invention is not to be limited thereto. The cut-out portion 110a and the first cut-out portion 113a and the second cut-out portion 115a may be formed in other portions according to the location of the antenna 102 disposed in the electronic apparatus 101.

As described above, the portable computer has been illustrated to include various types of electronic apparatuses described in the embodiments of FIGS. 2 to 4 according to the present invention. The present invention is not to be limited to the portable computer but may be applicable to other electronic apparatuses such as mobile phones and PDAs, by way of example.

As described in detail, the electronic apparatus according to the present invention can be reduced in size by having the cut-out portion corresponding to the antenna at the side surface of the liquid crystal display module such that the antenna can be coupled thereto.

In addition, because electronic apparatuses have recently been designed to accommodate not only a wireless LAN module but also a Bluetooth module for wireless local area communications, the number of antennas disposed in the electronic apparatus is increased. However, the electronic apparatus according to the present invention is provided with the cut-out portion corresponding to the antenna at the side surface of the liquid crystal display module such that the antenna can be coupled thereto, which contributes to reduced space in the electronic apparatus, thereby providing a plurality of antennas without increase in the size of the electronic apparatus.

What is claimed is:

1. A flat panel display device comprising: a flat display panel; a front cover having a first cut-out portion; a rear cover having a second cut-out portion; a bottom cover having a third cut-out portion, wherein the front cover, the rear cover, and the bottom cover are joined together to house the flat display panel therebetween in order to form a flat panel display module such that the first, the second, and the third cut-out portions are aligned to form a groove; a rear case and a front case coupled together for assembling the flat panel display module, the groove exposing a portion of the rear case; and an antenna attached at the portion of the rear case exposed by the groove, wherein the size of the groove formed by aligning the first cut-out portion to the second cut-out portion is the same as or smaller than the size of the antenna, wherein the front cover, the rear cover, the bottom cover, the flat display panel and the antenna are housed within the attached front and rear case.

2. The flat panel display of claim 1, further comprising a connection wire connecting the antenna, wherein the connection wire is aligned along a gap between an inner side surface of the joined front and rear covers and the attached front and rear cases.

3. The flat panel display of claim 1, wherein the flat display panel is a liquid crystal display panel.

4. The flat panel display of claim 1, wherein the flat display panel is an organic electroluminescent display panel.

5. The flat panel display of claim 1, wherein the groove is formed at the upper right hand portion of the display module.

6. The flat panel display of claim 1, wherein the first cut-out, the second cut-out, and the third cut-out portions have a substantially rectangular shape.

7. The flat panel display of claim 1, wherein the first cut-out, the second cut-out, and the third cut-out portions have a substantially concave shape.

8. An electronic device comprising: a main body; a display device connected to the main body, the display device including: a flat display panel; a front cover having a first cut-out portion; a rear cover having a second cut-out portion; a bottom cover having a third cut-out portion, wherein the front cover, the rear cover, and the bottom cover are joined together to house the flat display panel therebetween in order to form a flat panel display module such that the first, the second, and the third cut-out portions are aligned to form a groove, a rear case and a front case coupled together for assembling the flat panel display module, the groove exposing a portion of the rear case; and an antenna attached at the portion of the rear case exposed by the groove of the rear cover, the front cover, and the bottom cover, wherein the size of the groove formed by aligning the first cut-out portion to the second cut-out portion is the same as or smaller than the size of the antenna, wherein the front cover, the rear cover, the bottom cover, the flat display panel and the antenna are housed within the attached front and rear case.

9. The electronic device of claim 8, further comprising a connection wire connecting the antenna to a communication controller in the main body, wherein the connection wire is aligned along a gap between an inner side surface of the joined front and rear covers and the attached front and rear cases.

10. The electronic device of claim 8, wherein the flat display panel is a liquid crystal display panel.

11. The electronic device of claim 8, wherein the flat display panel is an organic electroluminescent display panel.

* * * * *